United States Patent [19]

Meikle

[11] Patent Number: 5,609,718

[45] Date of Patent: Mar. 11, 1997

[54] METHOD AND APPARATUS FOR MEASURING A CHANGE IN THE THICKNESS OF POLISHING PADS USED IN CHEMICAL-MECHANICAL PLANARIZATION OF SEMICONDUCTOR WAFERS

[75] Inventor: Scott G. Meikle, Boise, Id.

[73] Assignee: Micron Technology, Inc., Boise, Id.

[21] Appl. No.: 560,734

[22] Filed: Nov. 20, 1995

Related U.S. Application Data

[63] Continuation-in-part of Ser. No. 535,991, Sep. 29, 1995.

[51] Int. Cl.$^6$ ............................................. H01L 21/00
[52] U.S. Cl. ...................... 156/626.1; 156/636.1
[58] Field of Search ................ 156/626.1, 636.1; 216/84, 88, 89; 451/41, 6, 8

[56] References Cited

U.S. PATENT DOCUMENTS

| | | | |
|---|---|---|---|
| 4,200,395 | 4/1980 | Smith et al. | 356/356 |
| 4,203,799 | 5/1980 | Sugawara et al. | 156/601 |
| 4,358,338 | 11/1982 | Downey et al. | 156/627 |
| 4,367,044 | 1/1983 | Booth, Jr. et al. | 356/357 |
| 4,377,028 | 3/1983 | Imahashi | 29/574 |
| 4,422,764 | 12/1983 | Eastman | 356/357 |
| 4,640,002 | 2/1987 | Phillips et al. | 29/574 |
| 4,660,980 | 4/1987 | Takabayashi et al. | 356/357 |
| 4,879,258 | 11/1989 | Fisher | 437/225 |
| 5,036,015 | 7/1991 | Sandhu et al. | 437/8 |
| 5,069,002 | 12/1991 | Sandhu et al. | 51/165 R |
| 5,220,405 | 6/1993 | Barbee et al. | 356/357 |
| 5,232,875 | 8/1993 | Tuttle et al. | 437/225 |
| 5,272,117 | 12/1993 | Roth et al. | 437/228 |
| 5,324,381 | 6/1994 | Nishiguchi | 156/297 |
| 5,461,007 | 10/1995 | Kobayashi | 437/225 |
| 5,483,568 | 1/1996 | Yano et al. | 156/626.1 |
| 5,531,635 | 7/1996 | Mogi et al. | 451/72 |

*Primary Examiner*—Thi Dang
*Attorney, Agent, or Firm*—Seed and Berry LLP

[57] ABSTRACT

The inventive apparatus is a wafer planarizer that has a movable platen, a polishing pad positioned on the platen, a wafer carrier positioned opposite the polishing pad, and a measuring device that is engagable with the polishing pad. The polishing pad decreases as the wafer is conditioned in a straight line correlation with the resulting polishing rate of a wafer. The wafer is attachable to the wafer carrier, and it may be moved with the carrier to be selectively engaged with the polishing pad to planarize the wafer at a wafer polishing rate under a set of wafer polishing operating parameters. After the wafer is planarized, the pad is conditioned by removing a layer of material from the planarizing surface of the pad under a set of conditioning parameters. The measuring device measures the decrease in the thickness of the polishing pad after the pad is conditioned, and it correlates the actual decrease in pad thickness with an expected change in pad thickness. When the same pad conditioning parameters are used from one pad conditioning cycle to the next, a difference between the actual decrease in pad thickness and the expected change in pad thickness indicates a change in operating parameters.

3 Claims, 3 Drawing Sheets

METHOD AND APPARATUS FOR MEASURING A CHANGE IN THE THICKNESS OF POLISHING PADS USED IN CHEMICAL-MECHANICAL PLANARIZATION OF SEMICONDUCTOR WAFERS

RELATED APPLICATIONS

This application is a continuation-in-part of U.S. patent application Ser. No. 08/535,991 by Scott G. Meikle and Lucky F. Marty entitled "Method for Selectively Reconditioning a Polishing Pad Used in Chemical-Mechanical Planarization of Semiconductor Wafers," filed Sep. 29, 1995, now pending.

TECHNICAL FIELD

The present invention relates to an apparatus for measuring a change in the thickness of polishing pads used in making semiconductor devices with chemical-mechanical planarization processes, and a method to indicate an undesirable change in operating parameters.

BACKGROUND OF THE INVENTION

Chemical-mechanical planarization ("CMP") processes are frequently used to planarize dielectric layers in the production of ultra-high density integrated circuits. In a typical CMP process, a wafer is pressed against a slurry on a polishing pad under controlled chemical, pressure, velocity, and temperature conditions. Slurry, solutions generally contain small, abrasive particles of silica or alumina that mechanically remove the surface of the wafer, and chemicals that react with the materials of the dielectric layers to enhance the removal of the molecules on the surface of the wafer. The polishing pad is generally a planar pad made from a relatively soft, porous material such as blown polyurethane.

CMP processes must accurately planarize the dielectric layer to a desired end-point. Several hundred microelectronic devices are typically fabricated on a single wafer by depositing layers of various materials on the wafer, and manipulating the wafer and the other layers of material with photolithographic, etching, and doping processes. In order to manufacture ultra-high density integrated circuits, CMP processes must provide a uniformly planar surface so that the geometries of the component parts of a die may be accurately positioned across the full surface of the wafer. Thus, it is important to accurately planarize the wafers to a desired endpoint across the whole wafer.

In the competitive semiconductor industry, it is also highly desirable to maximize the throughput of the CMP processes to produce accurate, planar surfaces as quickly as possible. The throughput of CMP processes is a function of several factors including the rate at which the thickness of the wafer decreases as it is being planarized (the "polishing rate"), and the ability to accurately estimate the planarizing time to stop the process at a desired endpoint. A high polishing rate generally results in a greater throughput because it requires less time to planarize a wafer. Accurately estimating the planarization time is also important to maintaining a high throughput because planarization of a wafer is stopped once the estimated planarization time has elapsed to remove the wafer from the pad and measure the actual thickness of the wafer. If the thickness of the dielectric layer is not within an acceptable range, the wafer must be re-planarized until it reaches a desired endpoint. Such re-planarization of a wafer significantly reduces the throughput of current CMP processes, so it is very important to provide an accurate estimate of the planarization time.

One problem with current CMP processes is that they do not consistently produce a uniformly planar surface at the desired end-point because the wafer polishing rate may change over a number of wafers. Wafer polishing rates change for a number of reasons, and it is difficult to determine which one of the wafer polishing operating parameters must be corrected to bring them back to a desired level. Some of the wafer polishing operating parameters that affect the polishing rate include: (1) the downward pressure of the wafer against the slurry and pad; (2) the relative velocity between the wafer and the pad; (3) the chemical and abrasive characteristics of the slurry.; (4) the condition of the pad; and (5) the temperature of the slurry and the wafer. The downward pressure of the wafer and the relative velocity between the wafer and the pad are relatively easy to measure and indicate to the operator. The characteristics of the slurry, the temperature gradient across the wafer, and the condition of the pad, however, are difficult to ascertain. For example, a polishing pad will become less effective after planarizing a wafer because materials from the wafer and the slurry adhere to the surface of the pad and reduce the pad's ability to abrade the wafer. Polishing pads are consequently "conditioned" to bring them back to their optimal state for planarizing a wafer by abrading their surfaces with a diamond-embedded stone. Accordingly, if the polishing rate changes for a reason other than the pressure and velocity, the operator must guess whether the change was caused by the condition of the pad, the temperature gradient across the wafer, the effectiveness of the slurry, or some other reason that is not readily indicated on the control panel of the polisher. Therefore, it would be desirable to develop an apparatus and a method that indicates whether or not the polishing pad is the reason for a change in the polishing rate.

In addition to identifying which operating parameters have changed, a more fundamental problem with current CMP processes is that it is difficult to timely ascertain when an undesirable change in operating parameters has occurred. A change in the operating parameters is typically indicated by measuring the actual change in thickness of a number of wafers for a given planarizing time, and noting a significant change in the polishing rates over the number of wafers. Measuring the actual thickness of a wafer, however, is time-consuming because wafers are delicate and require sophisticated, clean-handling procedures. Thus, it would also be desirable to develop an apparatus and a method for indicating when an undesirable change in the operating parameters has occurred without having to measure the actual change in thickness of the wafers.

SUMMARY OF THE INVENTION

The inventive apparatus is a wafer planarizer that has a movable platen, a polishing pad positioned on the platen, a wafer carrier positioned opposite the polishing pad, and a measuring device engagable with the polishing pad. The wafer is attachable to the wafer carrier, and it may be moved with the carrier to be selectively engaged with the polishing pad to planarize the wafer. The surface layer of the wafer is planarized at a wafer polishing rate that is controlled by setting the wafer polishing operating parameters. After the wafer is planarized, the pad is conditioned by removing a layer of material from the planarizing surface of the pad. The thickness of the layer of material removed from the pad is controlled by setting a number of pad conditioning parameters, and the change in pad thickness over a conditioning cycle is directly related to the polishing rate of the next wafer. The measuring device measures the decrease in the thickness of the polishing pad after a pad conditioning cycle, and it correlates the actual decrease in pad thickness with an expected change in pad thickness. Thus, when the same pad conditioning parameters are used from one pad conditioning cycle to the next, a difference between the actual decrease in pad thickness and the expected change in pad thickness indicates a change in the wafer polishing operating parameters.

In accordance with a method of the present invention, a change in the wafer polishing operating parameters is identified by removing a layer of material from a planarizing surface on the pad according to a set of pad conditioning parameters. The pad conditioning parameters are set to remove a layer of material having a thickness equal to a desired change in pad thickness. An actual change in pad thickness is then measured after the removing step. The actual change in pad thickness is compared to the desired change in pad thickness, whereby a difference between the actual change in pad thickness and the desired change in pad thickness indicates an undesired change of the wafer polishing operating parameters.

DETAILED DESCRIPTION OF THE INVENTION

The present invention provides an apparatus for accurately measuring a small change in the thickness of a polishing pad, and method for identifying a change in wafer polishing operating parameters. A central aspect of the invention is the discovery of a straight line correlation between wafer polishing rates and changes in pad thickness per conditioning cycle. The amount of material removed from the pad during a conditioning cycle indicates the roughness of the pad, and thus it also indicates the resulting polishing rate of the pad. When the same wafer polishing operating parameters and the same pad conditioning parameters are used from one wafer to the next, the amount of material removed from the pad over a given conditioning cycle should be the same from one conditioning cycle to the next. The apparatus of the invention measures the actual change in the thickness of the pad in-situ after a pad conditioning cycle. A change in the wafer polishing operating parameters may be identified by comparing the actual change in pad thickness with an expected change in pad thickness that is based upon the previous changes in pad thickness per conditioning cycle. The structure of the apparatus and steps of the method of the invention are described in greater detail below in FIGS. 1–5, in which like reference numbers refer to like parts throughout the various figures.

Figure 1:
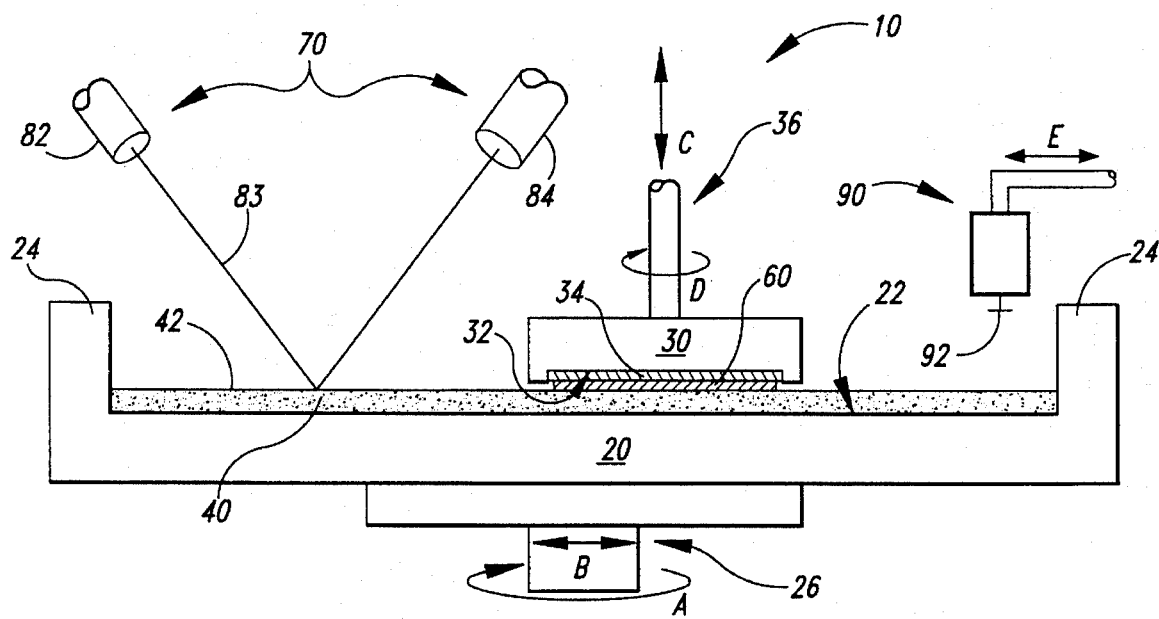
FIG. 1 is a schematic cross-sectional view of a chemical-mechanical planarization device in accordance with the invention.

FIG. 1 illustrates a wafer polisher 10 with a platen 20, a wafer carrier 30, a polishing pad 40, a measuring device 70, and a conditioning device 90. The platen 20 has an upper surface 22 upon which the polishing pad 40 is positioned. A drive assembly 26 either rotates the platen 20 as indicated by arrow A and/or reciprocates the platen 20 back and forth as indicated by arrow B. The motion of the platen 20 is imparted to the pad 40 because the polishing pad 40 frictionally engages the upper surface 22 of the platen 20.

The wafer carrier 30 has a lower surface 32 to which a wafer 60 may be attached. A resilient pad 34 may be positioned between the wafer 60 and the lower surface 32 to frictionally attach the wafer 60 to the wafer carrier 30. The wafer carrier 30 may be a weighted, free-floating wafer carrier, or it may have an actuator assembly 36 attached to it for imparting axial and rotational motion as indicated by arrows C and D, respectively.

A measuring device 70 engages at least one area on the polishing pad 40 to measure the change in the thickness of the pad 40. The measuring device 70 is preferably a laser position sensor or a laser interferometer with an emitter 82 and a detector 84. The emitter 82 shoots a laser beam 83 onto a planarizing surface 42 of the polishing pad 40. The laser beam 83 reflects off of the planarizing surface 42 and travels back up to the detector 84. Other measuring devices such as a capacitance meter that measures the capacitance of the polishing pad 40 or a stylus are also within the scope of the invention. The measuring device 70 preferably engages the surface of the pad after the pad is conditioned, and accurately measures the change in thickness of the pad 40 to within 0.2 μm. Accordingly, the measuring device 70 provides in-situ measurement of the change in thickness of the polishing pad 40.

The conditioning device 90 is positioned over the pad 40. The conditioning device 90 has a disk 92 with an abrasive surface for engaging the planarizing surface 42 of the pad 40. In operation, the disk 92 rotates while it engages the planarizing surface 42, and the conditioning device 90 moves across the polishing pad 40 in a direction indicated by arrow E as the pad 40 rotates on the platen 20. The conditioning device 90 selectively removes a layer of material from the planarizing surface 42 of the pad 40 to create a new planarizing surface. The thickness of the layer of material removed from the pad is controlled by setting a number of pad conditioning parameters. The pad conditioning parameters generally include the elapsed time of the conditioning cycle, the abrasiveness of the disk 92, the downforce of the conditioning device 90, and the material from which the pad 40 is made. As explained in detail below, when both the wafer polishing operating parameters and the pad conditioning parameters are constant from one conditioning cycle to the next, the thickness of material removed from the pad should also be the same for each conditioning cycle. The pad 40 is preferably conditioned with the conditioning device 90 after each wafer is planarized.

Figure 2:
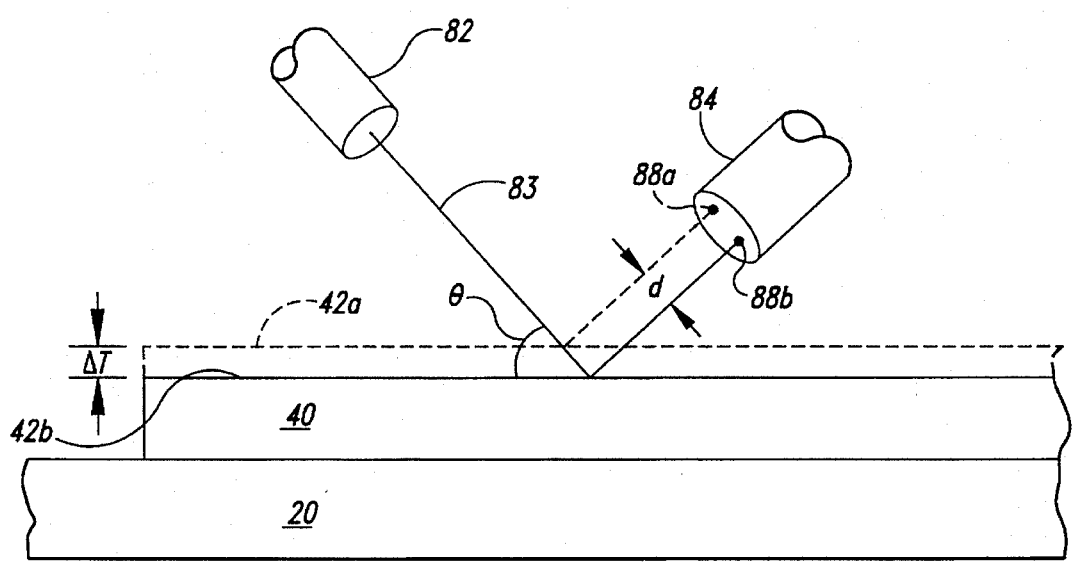
FIG. 2 is a schematic cross-sectional view of a measuring device for a chemical-mechanical planarization apparatus in accordance with the invention.

FIG. 2 further illustrates a laser position sensor with a laser emitter 82 and a detector 84. The laser beam 83 initially reflects off the original planarizing surface 42(a) of the pad 40 to an original detection point 88(a) on the detector 84. As the thickness of the pad 40 decreases because of conditioning, the surface of the pad 40 moves down to a subsequent planarizing surface 42(b). The distance between the original planarizing surface 42(a) and subsequent planarizing surface 42(b) is the change in thickness of the pad 40 (ΔT). The laser beam 83 reflects off the subsequent planarizing surface 42(b) and travels to a subsequent detection point 88(b) on the detector 84. The detection points 88(a) and 88(b) are separated by a distance "d." By knowing the angle of inclination θ of the laser beam 83 with respect to the surface of the pad 40 and the distance "d" between the detection points 88(*a*) and 88(*b*), the change in thickness ΔT of the pad 40 may be calculated as follows:

$$\Delta T = (d) \sin \theta.$$

Once the difference in the thickness of the pad ΔT is determined, an undesired change in wafer polishing parameters may be identified.

Figure 3:
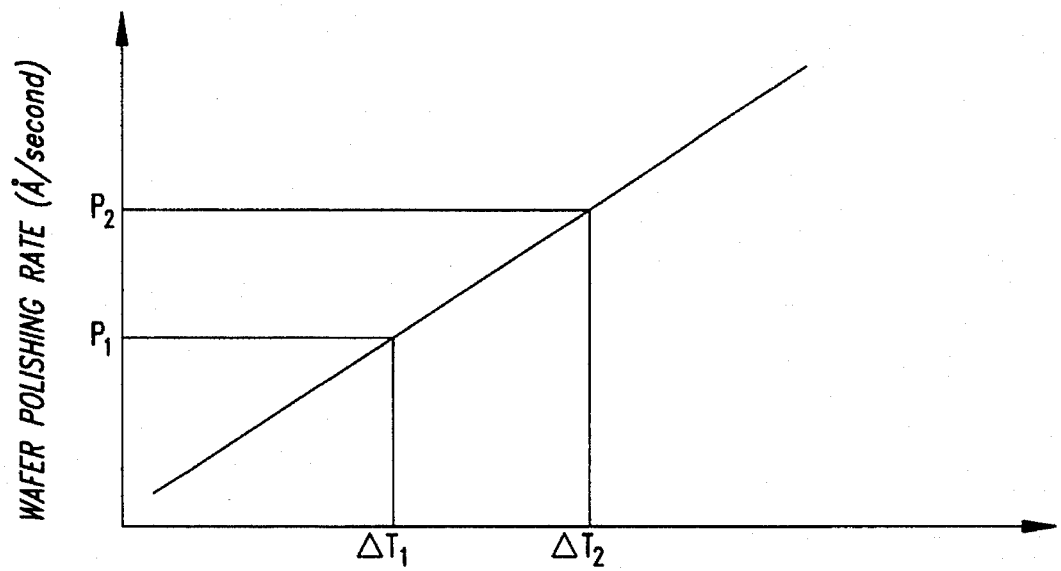
FIG. 3 is a graph illustrating the straight line correlation between wafer polishing rates and changes in pad thickness per conditioning cycle.

The measured change in pad thickness ΔT caused by conditioning indicates an undesired change in wafer polishing operating parameters when the same pad conditioning parameters are used for each conditioning cycle, but the measured change in pad thickness for the latest cycle is different from those of previous cycles. Referring to FIG. 3, the change in pad thickness per conditioning cycle is directly related to the wafer polishing rate in a straight line relationship. For example, a change in pad thickness of $\Delta T_1$ μm/cycle corresponds to a wafer polishing rate of $P_1$ Å/s, and a change in pad thickness of $\Delta T_2$ μm/cycle corresponds to a wafer polishing rate of $P_2$ Å/s. Since the wafer polishing rate is affected by a change in the wafer polishing operating parameters, and the change in pad thickness per conditioning cycle is related to the wafer polishing rate, a change in the wafer polishing operating parameters will also affect the change in pad thickness per conditioning cycle. In accordance with the discovery of the invention, unless a change occurs in either the pad conditioning parameters or the wafer polishing operating parameters, the change in pad thickness per conditioning cycle should remain the same over a large number of conditioning cycles. Thus, when a pad is conditioned using the same pad conditioning parameters for each conditioning cycle, a difference in the change in the pad thickness from one conditioning cycle to another indicates that a change in the wafer operating parameters has occurred.

One advantage of the present invention is that provides a timely indication that the wafer polishing operating parameters have changed without measuring the planarized wafers. In accordance with the invention, only the change in pad thickness per conditioning cycle needs to be measured to indicate that a change has occurred in the wafer polishing operating parameters. Since the wafer planarizer 10 of the invention measures changes in pad thickness in-situ and at each conditioning cycle, a change in the wafer polishing operating parameters may be indicated between each wafer polishing and without touching the wafers themselves.

Another advantage of the present invention is that it may be used to selectively recondition a polishing pad to obtain a desired wafer polishing rate as disclosed in the related application set forth above. Once a difference in the change in pad thickness per conditioning cycle is measured from one cycle to the next, the pad conditioning parameters may be changed to selectively recondition the pad to obtain a desired polishing rate. For example, if a desired wafer polishing rate of $P_1$ Å/s corresponds to a change in pad thickness per conditioning cycle of 1.0 μm/cycle, and if 5.0 μm of material is removed from a pad during a conditioning cycle, then the pad conditioning parameters could be reset during the next few pad conditioning cycles until only 1.0 μm of material is removed from the planarizing surface of the pad at each conditioning cycle. It will be appreciated that the desired wafer polishing rate of $P_1$ Å/s will be obtained once the change in pad thickness per conditioning cycle is 1.0 μm/cycle only if the other wafer polishing operating parameters have in fact remained the same. Thus, by changing the pad conditioning parameters to remove the desired amount of material from the pad, the desired wafer polishing rate may be obtained when the other wafer polishing operating parameters have remained the same.

Figure 4:
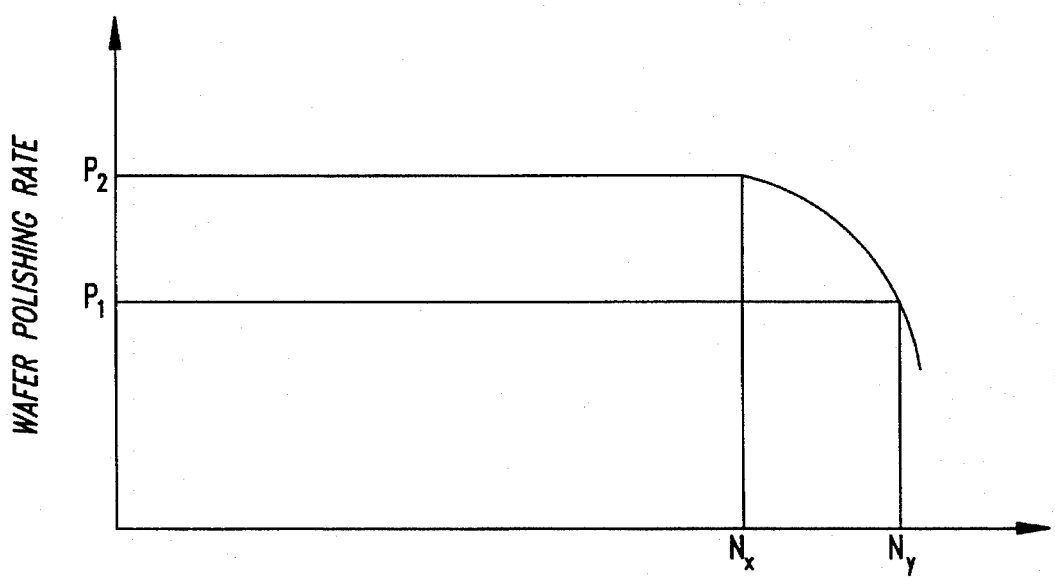
FIG. 4 is a graph illustrating the polishing rate of wafers.

More specifically, the wafer polisher 10 may be used to identify whether or not the condition of the pad 40 is the source of a change in the polishing rate of the wafer. FIG. 4 illustrates an example of a typical change in the polishing rate in a CMP process over a number of wafers. Up until the number of wafers polished equals $N_x$, the polishing rate of the wafers is constant at $P_2$ Å/s. After the number of polished wafers exceeds $N_x$, the polishing rate begins to drop off precipitously such that when the number of polished wafers equals $N_y$, the polishing rate is equal to $P_1$ Å/s. The pad 40 can generally be isolated as the reason for a change in the wafer polishing rate if the actual change in pad thickness, as measured by the planarizer 10 of the invention, corresponds to the expected change in pad thickness as determined by the polishing rate and the straight-line relationship shown in FIG. 3. For example, once the polishing rate of the wafer 60 changes at $N_y$, the change in pad thickness in conditioning cycle would be estimated to be $\Delta T_1$ μm/cycle according to the straight line correlation shown in FIG. 3. If the actual change in pad thickness as measured by the wafer planarizer 10 is equal to $\Delta T_1$ μm/cycle, then the change in the polishing rate was most likely due to the conditioning of the pad. If, however, the actual change in pad thickness is not reasonably close to $\Delta T_1$ μm/cycle, then the actual change in pad thickness indicates that the pad 40 is still in good condition and is likely not the reason for the change in the polishing rate. Therefore, the wafer planarizer 10 can more particularly indicate whether or not the condition of the pad 40 is the source of a change in the polishing rate of the wafer 60.

Figure 5:
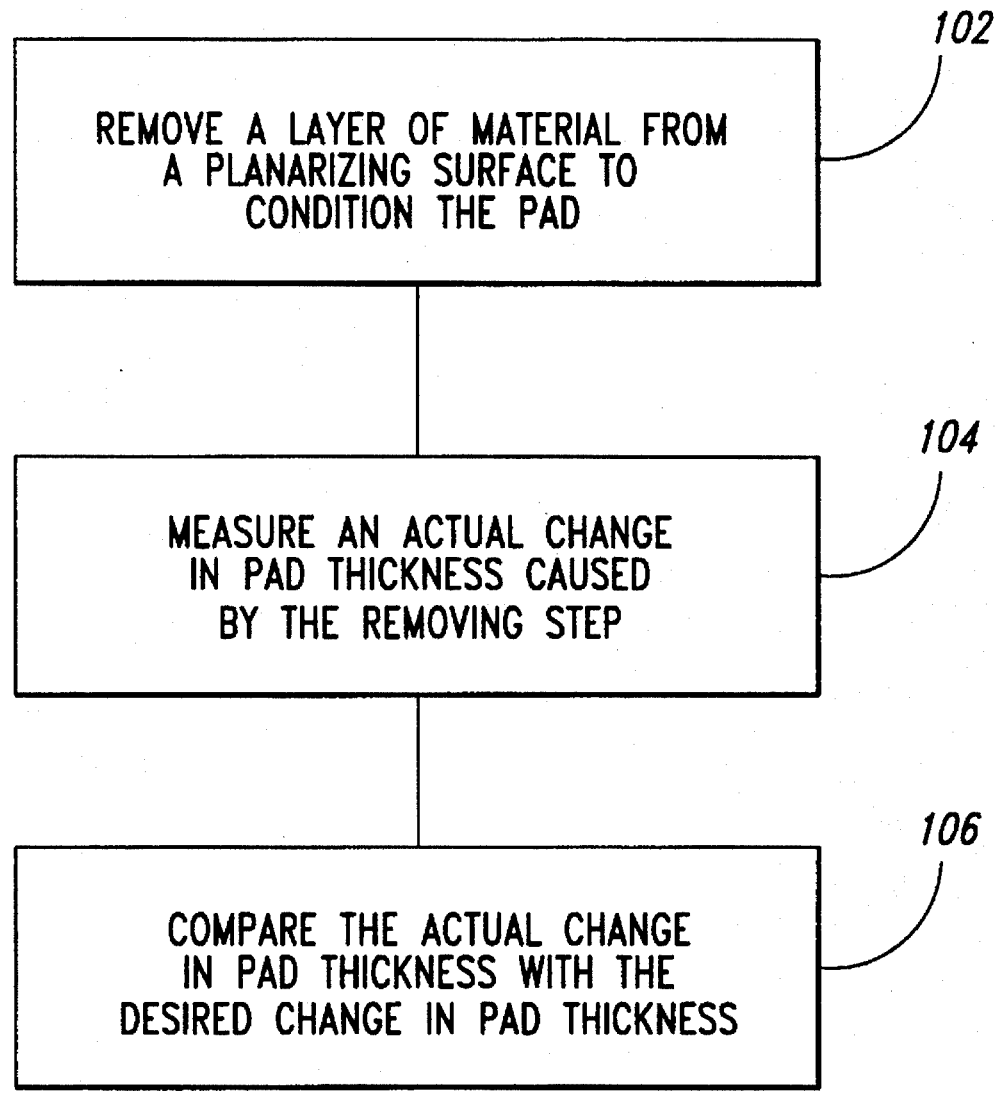
FIG. 5 is a flow chart illustrating a method in accordance with the invention.

FIG. 5 schematically illustrates a method of identifying whether a change in the wafer operating parameters has occurred. The first step 102 is to remove a layer of material from a planarizing surface on the pad to condition the pad according to a set of pad conditioning parameters. The pad conditioning parameters are desirably kept constant from one conditioning cycle to the next so that the pad conditioning parameters can be eliminated as the source of any difference in the amount of material that is removed from the pad from one conditioning cycle to another. Accordingly, an expected change in pad thickness is generally equal to the change in pad thickness of prior conditioning cycles. The second step 104 is to measure an actual change in pad thickness since the last conditioning using the wafer planarizer 10 described above with respect to FIGS. 1 and 2. The third step 104 is to compare the actual change in pad thickness with the expected change in pad thickness. A difference between the actual change in pad thickness and the expected change in pad thickness indicates that a change in the wafer operating parameters has occurred.

While the detailed description above has been expressed in terms of a specific example, those skilled in the art will appreciate that many other structures could be used to accomplish the purpose of the disclosed procedure. Accordingly, it can be appreciated that various modifications of the above-described embodiment may be made without departing from the spirit and scope of the invention. Therefore, the spirit and scope of the present invention are to be limited only by the following claims.

What is claimed is:

1. In chemical-mechanical planarizing of a semiconductor wafer against a polishing pad, a method of identifying a change in wafer polishing operating parameters, comprising the steps of:

removing a layer of material from a planarizing surface on the pad to condition the pad according to a set of conditioning parameters, the conditioning parameters being set to remove a layer of material having a thickness equal to an expected change in pad thickness;

measuring an actual change in pad thickness caused by the removing step; and comparing the actual change in pad thickness with the expected change in pad thickness, whereby a difference between the actual change in pad thickness and the expected change in pad thickness indicates an undesired change of the wafer polishing operating parameters.

2. The method of claim 1 wherein a wafer planarizer with a measuring device for determining a change in pad thickness is provided, the measuring step further comprising determining a change in thickness of the pad with the measuring device after each removing step.

3. The method of claim 2 wherein the measuring device is a laser position sensor and the determining step comprises engaging the pad with a laser beam and sensing a change in position of the laser beam with a detector.

* * * * *